United States Patent
Rao et al.

(10) Patent No.: US 7,957,273 B2
(45) Date of Patent: Jun. 7, 2011

(54) PACKET RE-TRANSMISSION CONTROLLER FOR BLOCK ACKNOWLEDGEMENT IN A COMMUNICATIONS SYSTEM

(75) Inventors: Satyanarayana Rao, Hyderabad (IN); Venkata Rao Gunturu, Guntar(DT) (IN); Narasimhan Venkatesh, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 29 days.

(21) Appl. No.: 12/134,204

(22) Filed: Jun. 6, 2008

(65) Prior Publication Data

US 2009/0303998 A1  Dec. 10, 2009

(51) Int. Cl.
*H04J 3/14* (2006.01)
(52) U.S. Cl. ...................................................... 370/229
(58) Field of Classification Search .................. None
See application file for complete search history.

(56) References Cited

U.S. PATENT DOCUMENTS

| | | | |
|---|---|---|---|
| 6,545,982 B1 * | 4/2003 | Murthy et al. | 370/245 |
| 6,587,463 B1 * | 7/2003 | Hebb et al. | 370/392 |
| 7,543,087 B2 * | 6/2009 | Philbrick et al. | 710/33 |
| 2002/0172199 A1 * | 11/2002 | Scott et al. | 370/389 |
| 2004/0141759 A1 * | 7/2004 | Stiscia et al. | 398/168 |
| 2007/0110055 A1 * | 5/2007 | Fischer et al. | 370/389 |
| 2007/0230493 A1 * | 10/2007 | Dravida et al. | 370/412 |

\* cited by examiner

*Primary Examiner* — Chirag G Shah
*Assistant Examiner* — Amarnauth Persaud
(74) *Attorney, Agent, or Firm* — File-EE-Patents.com; Jay A. Chesavage

(57) ABSTRACT

A re-transmit processor for a wireless communication system includes a pointer memory which contains pointers associated with particular packet data in a host memory. The retransmit processor directs data associated with said pointers to be applied to a media access controller, which optionally contains an encryption function, the output of which is coupled to a block buffer and to an output interface. Upon receipt of a transmission request, the host memory locations associated with the pointers are read and the data directed to the media access controller, which adds a header, a CRC, and optionally encrypts the data, thereafter placing it in the block buffer and the output interface. Upon provision of the packet data to the MAC, the associated pointer is initialized to a FREE or UNUSED value, and upon receipt of an acknowledgement of the packet accompanied by a packet identifier from a receiving station, the packet associated with the packet identifier is removed from the block buffer.

17 Claims, 5 Drawing Sheets

Block Ack Processor w/retransmit Controller

PER-PKT ACK

BLOCK ACK

BLOCK ACK (missing packets 2&4)

Block Ack Processor

Transmit Process

Packet Buffer
Before transmit

Packet Buffer
during retransmit

Block Ack Processor w/retransmit Controller

ACK/Retransmit Controller

PACKET RE-TRANSMISSION CONTROLLER FOR BLOCK ACKNOWLEDGEMENT IN A COMMUNICATIONS SYSTEM

FIELD OF THE INVENTION

The present invention relates to a packet re-transmission controller for a block acknowledgement communications protocol in a wireless communication system.

BACKGROUND OF THE INVENTION

FIG. 1A shows a prior art protocol for acknowledging wireless packets on a per-packet basis. A wireless access point shown as AP1 102 transmits a first packet PKT1 106, which the wireless receiving station STA1 104 receives and acknowledges with an acknowledgement packet ACK1 108. The access point AP1 102 similarly sends additional packets PKT2, PKT3, PKT4, and PKT5, each of which is respectively acknowledged by ACK2, ACK3, ACK4, and ACK5. If a particular packet is not received or acknowledged such as PKT6 114, it is retransmitted 116 after an interval of time until it is acknowledged 118.

FIG. 1B shows a prior art block acknowledgement transmission protocol, whereby access point AP1 130 transmits a block of packets PKT1 through PKT6 134, along with a block acknowledgement request 136 which identifies the packets transmitted. If all packets were received, the station 132 sends a single acknowledgement 138 for the received packets PKT1 through PKT6. FIG. 1C shows a prior art block acknowledgement where packets 2 and 4 are not received. AP1 150 sends packets PKT1 through PKT6 154, along with block acknowledgement request 156. The station STA1 152 then acknowledges receipt of packets 1, 3, and 5-6. AP1 150 responds by re-transmitting packets 2 160 and 4 162 with a new block acknowledgement request 164 for retransmitted packets 2 and 4, which are later acknowledged 166.

FIG. 2A shows a block diagram for a prior art block acknowledgement processor 200. Packets to be transmitted are in the form of payload data stored in the host memory 204, which is typically external memory and coupled to a CPU 208 via a memory controller (not shown). The Central Processing Unit (CPU) 208 reads the payload data from host memory 204 and writes a particular block to be transmitted to the packet buffer 202, organizing the data in the packet buffer 202 by arrangement as payload data for each individual packet to be transmitted, shown as pkt1 through pkt 7 205. A Media Access Controller (MAC) 206 reads the packet data, one packet at a time, and forms a frame including a MAC (layer two) source and destination address, other header information, and a CRC (Cyclic Redundancy Check) as is known in the art of packet processing. The resulting data to be transmitted is transferred from host memory 204 and buffered into packet buffer 202, shown as pkt1 . . . pkt7. Optionally, the packet contents may be encrypted using the encryption engine 207 such as a packet at a time shown as epkt1 209, after which the baseband processor 210 performs digital processing and encoding necessary to provide a baseband signal suitable for modulation to a carrier frequency by the PHY 212, amplification 214, and transmission to the antenna 216.

FIG. 2B shows the prior art transmit process 250 performed by the CPU 208 and MAC 206 of FIG. 2A, whereby the CPU moves the data such as pkt1 through pkt7 from host memory to packet buffer in step 254, and the packets are successively transmitted 256 followed by the transmission of a block acknowledgement request 258 which includes identification of the packets transmitted in step 256. If an acknowledgement 260 is received from the remote station with all packets indicated as received, the process ends in step 266. If missing packets are detected, only the missing packets are transferred from host memory to packet memory 261, re-transmitted 262, which optionally includes re-encryption for encrypted packets, and a new acknowledgement request 214 is sent. An acknowledgement is subsequently received in step 260, either indicating all packets have been received, or providing a list of packets yet to be received.

FIG. 2C shows the arrangement of data in the packet buffer 202 of FIG. 2C, which may be an on-chip part of the MAC 206. The memory buffer 202 is divided into discrete units, each of which contains payload data for a particular packet which have been transferred from host memory 204. In one version of the prior art, when packets are not received by a station, such as packets 2 and 4 as shown 204, the packet buffer contents remain along with the previously sent packets, as shown in FIG. 2D, until the missing packets 204 are successfully transmitted, after which the packet buffer may be fully overwritten with the new packet buffer contents for the next block. During the interval of time awaiting confirmation of receipt of the block of data which includes the lost packets, the on-chip memory 202 is unavailable for any other purpose, such that for the example of a 7 packet transmission, for which 2 were lost, the received 5 packets remain in the buffer until the retransmitted two packets are acknowledged. In another version of the prior art, the host memory is used for temporary storage of transmitted packets until acknowledgement, which requires CPU bandwidth resources and MAC bandwidth and memory resources to re-transfer the missing packets from the host memory to packet buffer memory. If the lost packet requires encryption, the replacement packet it typically re-encrypted, requiring additional encryption resources.

One problem of the prior art block acknowledgement processors is that the packet buffer 202 remains filled with previously-sent packets, and remains unusable for a block of new packets until the missing packets of the previous block are transmitted and acknowledged.

Another problem of the prior art block acknowledgement processor is that computationally intensive operations, such as the encryption performed by processor 207, must be performed each time a packet is to be re-transmitted.

OBJECTS OF THE INVENTION

A first object of this invention is a packet re-transmit processor for a wireless system whereby pointers are used to identify packets to be transmitted, each packet to be transmitted is stored in a host memory, the retransmit controller is responsible for delivering the packets from a host memory to a MAC memory and to an optional encryption engine, thereafter to a block buffer, such that if a transmitted packet is not subsequently block acknowledged, the unacknowledged packet is retransmitted from the block buffer, thereby saving the time required to transfer the packet from host memory to packet memory, and the time and computation resources required to re-encrypt the packet.

A second object of the invention is a re-transmit processor which manages a pointer memory comprising a series of pointers to data stored in a host memory, where the re-transmit processor also manages delivery of data referenced by the pointers from a host memory to a media access controller (MAC) which also performs encryption, the encrypted packets being delivered to a block buffer under control of the re-transmit processor such that any packets which are not acknowledged are re-transmitted directly from the block buffer.

SUMMARY OF THE INVENTION

A wireless access point or station has a host memory for the storage of data to be transmitted, a pointer memory for storage and updating of pointers, each pointer being associated with a particular packet to be transmitted from the host memory, a media access controller (MAC) which optionally includes an encryption engine, and a block buffer for storing packets to be delivered to an output interface. A re-transmission controller handles the assignment of pointers to an associated packet stored in host memory, delivers the data referenced by the packet pointers to the MAC, which MAC adds headers, a CRC, and optionally encrypts the payload data, providing an encrypted packet to the block buffer. After each packet is delivered to the MAC, the associated pointer is cleared, and after each transmitted packet is acknowledged, the associated block buffer data is cleared. In this manner, the host memory contains only data that is to be delivered to the MAC, and the block buffer contains only transmitted data that has not yet been acknowledged by the remote station, which block buffer data is destined either for retransmission or deletion.

DETAILED DESCRIPTION OF THE INVENTION

Figure 3A:
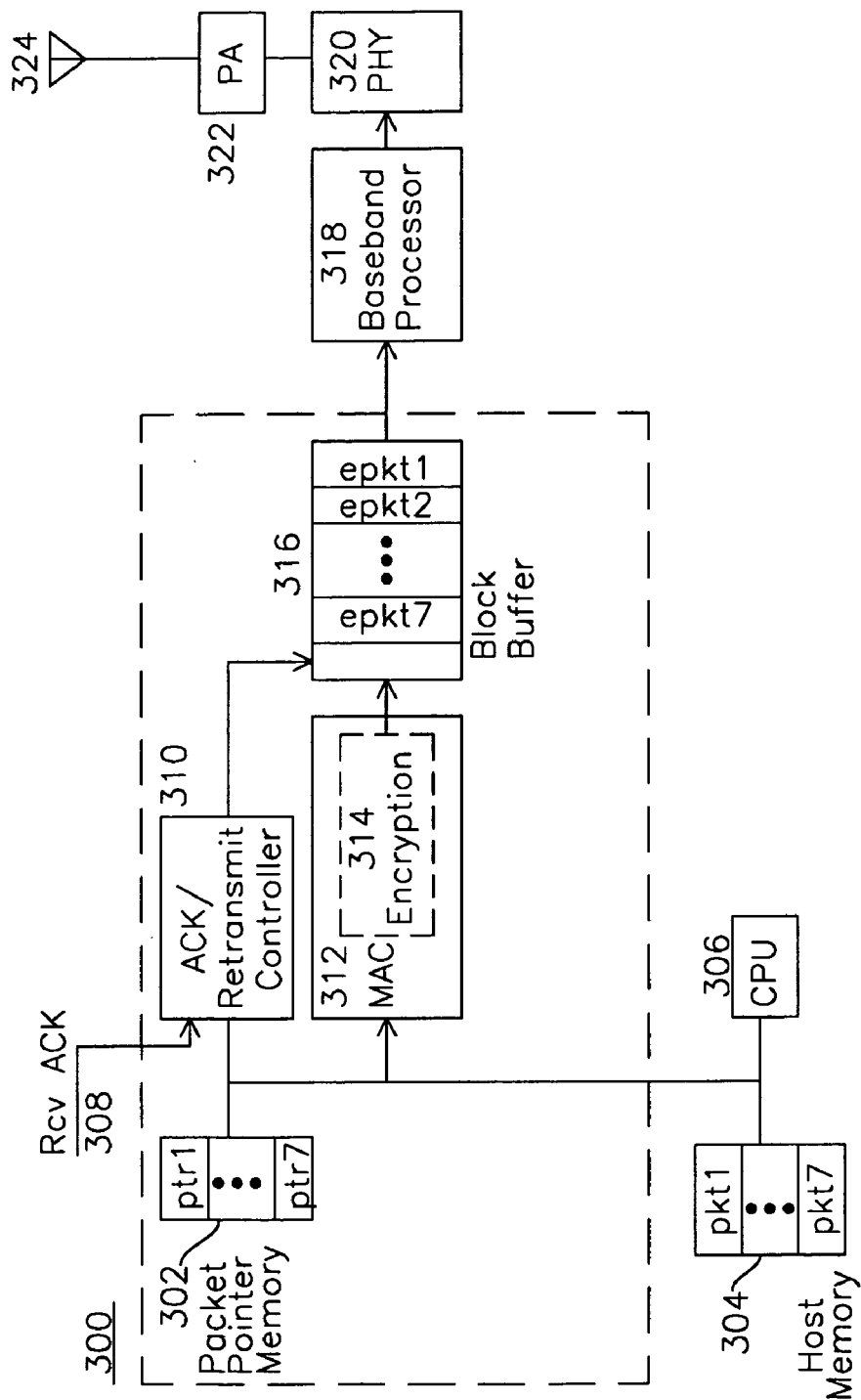
FIG. 3A shows the block diagram for an acknowledgement processor with a re-transmit controller.

FIG. 3A shows a block acknowledgement processor 300 for one embodiment of the present invention. Host memory 304 contains packets to be transmitted, as before, with packet pointer memory 302 containing pointers to the packets in host memory, shown for pkt1 through pkt7. The packet pointers may be a linked list, pointers to other pointers, or any system for referencing a plurality of packet as is known in the prior art such that each packet in a host memory 304 has an associated pointer stored in pointer memory 302. The CPU 306 is coupled to, and initializes, the pointer memory 302, host memory 304, and retransmit controller 310, after which the retransmit controller 310 uses the pointers stored in pointer memory 302 to direct packet data to the MAC 312, which may optionally contain an encryption stage 314, as was described earlier. During packet transmissions, packets to be transmitted such as pkt1 through pkt7 are addressed by respective pointers ptr1 through ptr7, each packet is moved from the host memory 304 to the MAC 312, which performs typical media access controller operations as described in IEEE standard 802.11a, b, g, or any of the wireless standards which describe the layer 2 mechanism for transport of data. Typically, a source MAC address, destination MAC address, header information, and a CRC are added by the MAC 312. Optionally, packet payload encryption 314 may be performed using the Wireless Encryption Protocol (WEP), or any of the available prior art protocols for data packet security. After encryption 314, the packets are stored in block buffer 316, which has sufficient storage for the number of data packets in a particular block transmission. The block buffer 316 is controlled by the retransmit controller 310, such that encrypted or unencrypted packets from the MAC 312 remain stored in the block buffer 316 after they are sent to the baseband processor 318, which converts to the required wireless signal protocol modulation type such as OFDM, and then upconverts the baseband symbol stream to a carrier frequency such as with PHY 320, amplified 322, after which the packets are transmitted to the remote station via antenna 324. The processor 300 also includes receive signal processing (not shown) which receives packets including block acknowledgement packets which indicate which particular packets of a block were successfully received, the received block acknowledgements applied from the receiver to input 308 of FIG. 3A. After a particular block acknowledgement for the packets in block buffer 316 is successfully received, the corresponding packets are removed from block buffer 316, whereas if an acknowledgement 308 is not received during a timeout interval, the packet is retransmitted using the missing packets remaining in packet buffer 316 until an acknowledgement for the particular transmitted packets 308 is received.

Figure 1A:
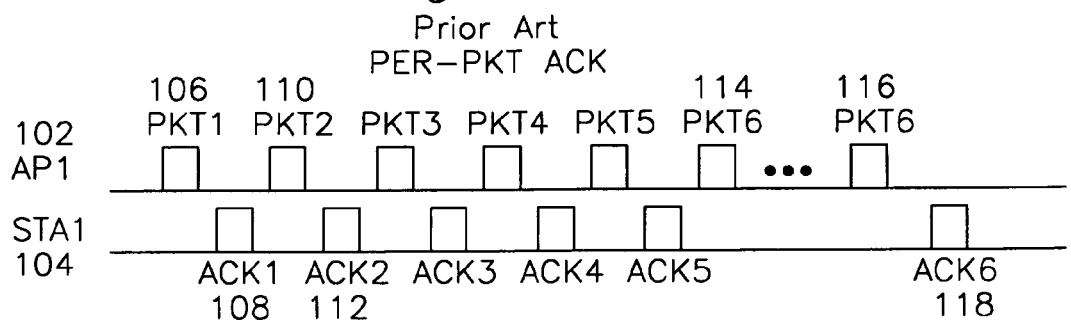
FIG. 1A shows a time diagram for wireless per-packet transmission and acknowledgement.
Figure 1B:
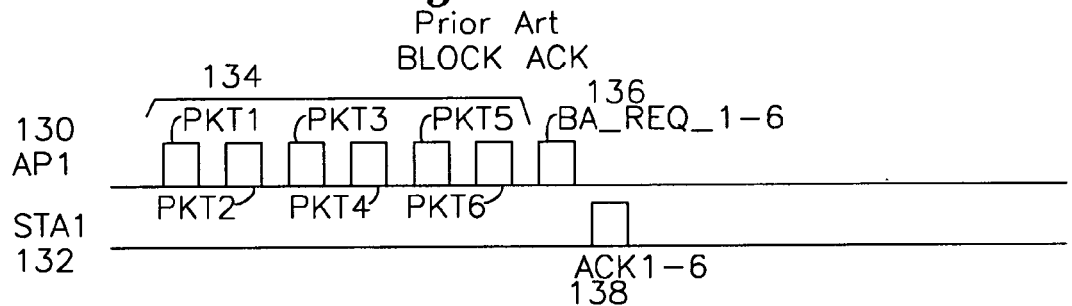
FIG. 1B shows a time diagram for a block wireless transmission and acknowledgement.
Figure 1C:
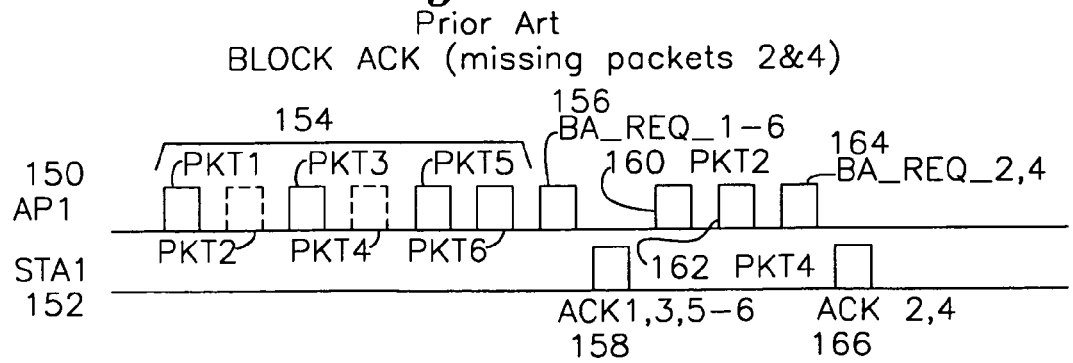
FIG. 1C shows a time diagram for a block wireless transmission and acknowledgement after loss of packets.
Figure 2A:
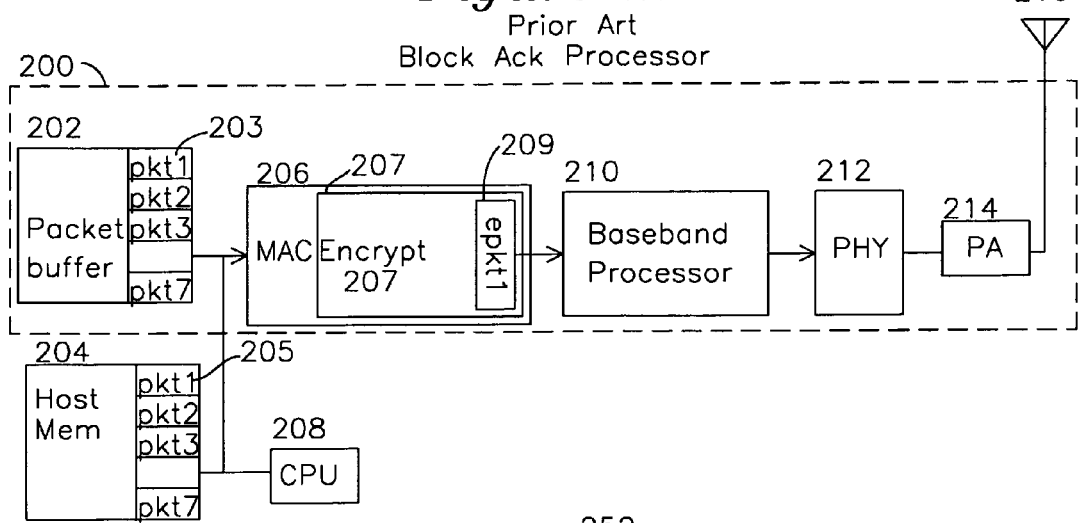
FIG. 2A shows the block diagram for a prior art block acknowledgement processor.
Figure 2B:
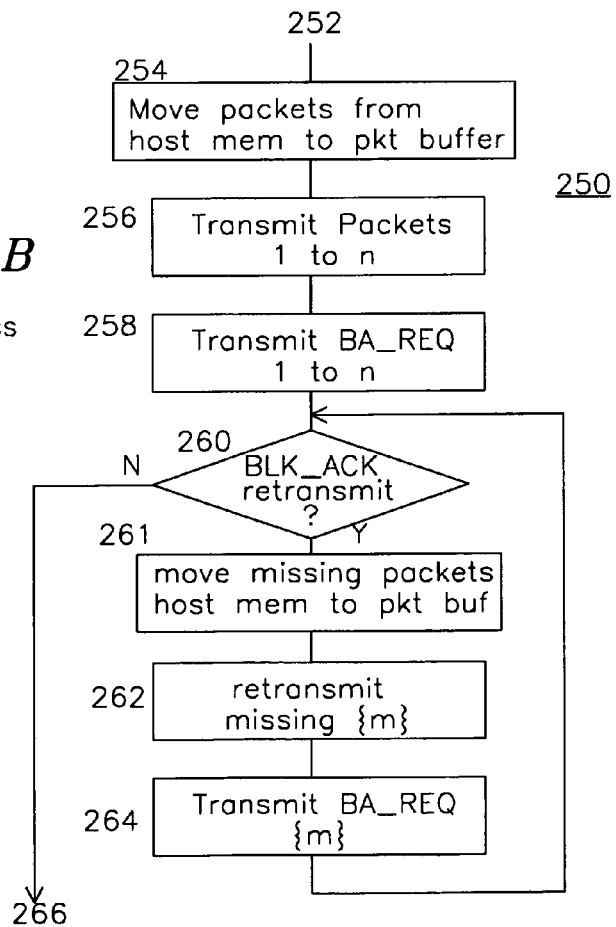
FIG. 2B shows a prior art transmit process for the processor of FIG. 2A.
Figure 2C:
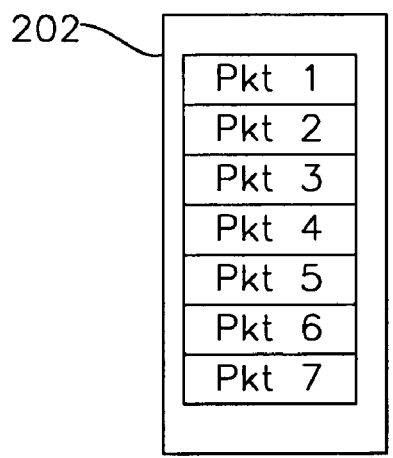
FIG. 2C shows a prior art packet buffer contents before a transmit operation.
Figure 2D:
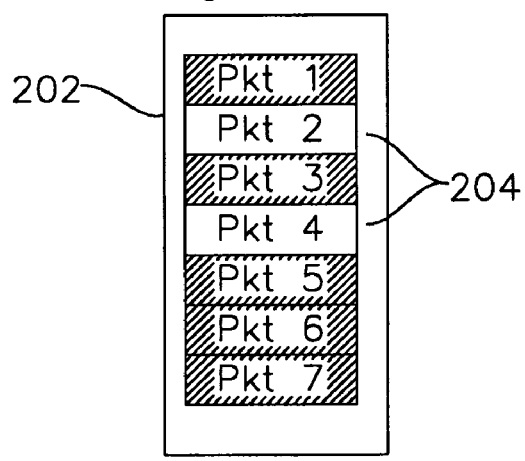
FIG. 2D shows a prior art packet buffer contents during a re-transmit operation.

There are several advantages of the present block acknowledgement processor compared to the prior art of FIG. 2A. When packets pkt2 and pkt4 which were sent as encrypted packets are to be re-transmitted, the loss of just a single packet results in a retransmission operation which carries almost the same overhead as the original packet transmission in memory requirements, and a corresponding burden on resources which could be used for transmitting original packets. For the prior art FIG. 2A, the retransmission steps are:

1) Receive ACK which indicates packets pkt2 and pkt4 were not received.

2) Copy missing packets pkt2, pkt4 from Host Memory to Packet Buffer.

3) Establish pointers to begin transmitting missing packets pkt2 and pkt4 from Packet Buffer;

4) Encrypt packets pkt2 and pkt4;

5) send encrypted packets pkt2 and pkt4 to baseband processor for transmission to antenna 216;

6) After acknowledgement of pkt2 and pkt4 reception, delete block of packets pkt1 through pkt7 from host memory.

For the packet retransmission controller of FIG. 3A, the retransmission steps are:

1) Receive ACK which indicates packets pkt2 and pkt4 were not received.

2) Directly retransmit pkt2 and pkt4 from block buffer (pkts remain in block buffer until acknowledgement)

3) After acknowledgement of pkt2 and pkt4 reception, delete pkt2 and pkt4 from block buffer.

Additional functions can be performed by the block buffer 316 of FIG. 3A before placement of the packet in the block buffer. The host memory or packet descriptors may be read to establish address fields, sequence numbers, and other information such as QOS information for use in the packet stored in block buffer 316. Additionally, the packet may be formed and placed in the block buffer 316 after aggregation of two packets of the same type. If the aggregated packet is to be encrypted, the encryption can be performed over the resulting aggregated packet. Additionally, the block buffer 316 can perform the CRC computation on the encrypted or unencrypted packet, since the storage of the packet for retransmission until it is acknowledged as receives eliminates the requirement of re-computing the CRC or re-encrypting a retransmission packet at some point in the future.

There are many ways that the retransmit controller 310 may be realized, however the essential elements of the present invention are the use of a block buffer 316 that receives packets from the MAC 312 (which optionally includes data encryption 314), where the block buffer 316 maintains transmitted packets until they have been acknowledged, after which they are removed or overwritten with new packet transmission buffer data once an acknowledgement is received for an associated packet. Also associated with the re-transmit controller is a pointer memory, which has a set of pointers or descriptors that point to locations in the host memory 304. Each pointer is associated with a particular packet to be transmitted, and after the data stored in the host memory 304 associated with each pointer is moved to the MAC 312, the associated pointer is reinitialized, thereby freeing the pointer for use in storing a different packet. The advantage of storing pointers in on-chip pointer memory 302 rather than the actual packet is the dramatic reduction in memory requirement. The reduction in memory size requirement comes at the expense of greater latency in moving data from host memory to the media access controller, which the block buffer 316 greatly improves by reducing the latency and bandwidth required for retransmission events which would otherwise consume this bandwidth.

Figure 3B:
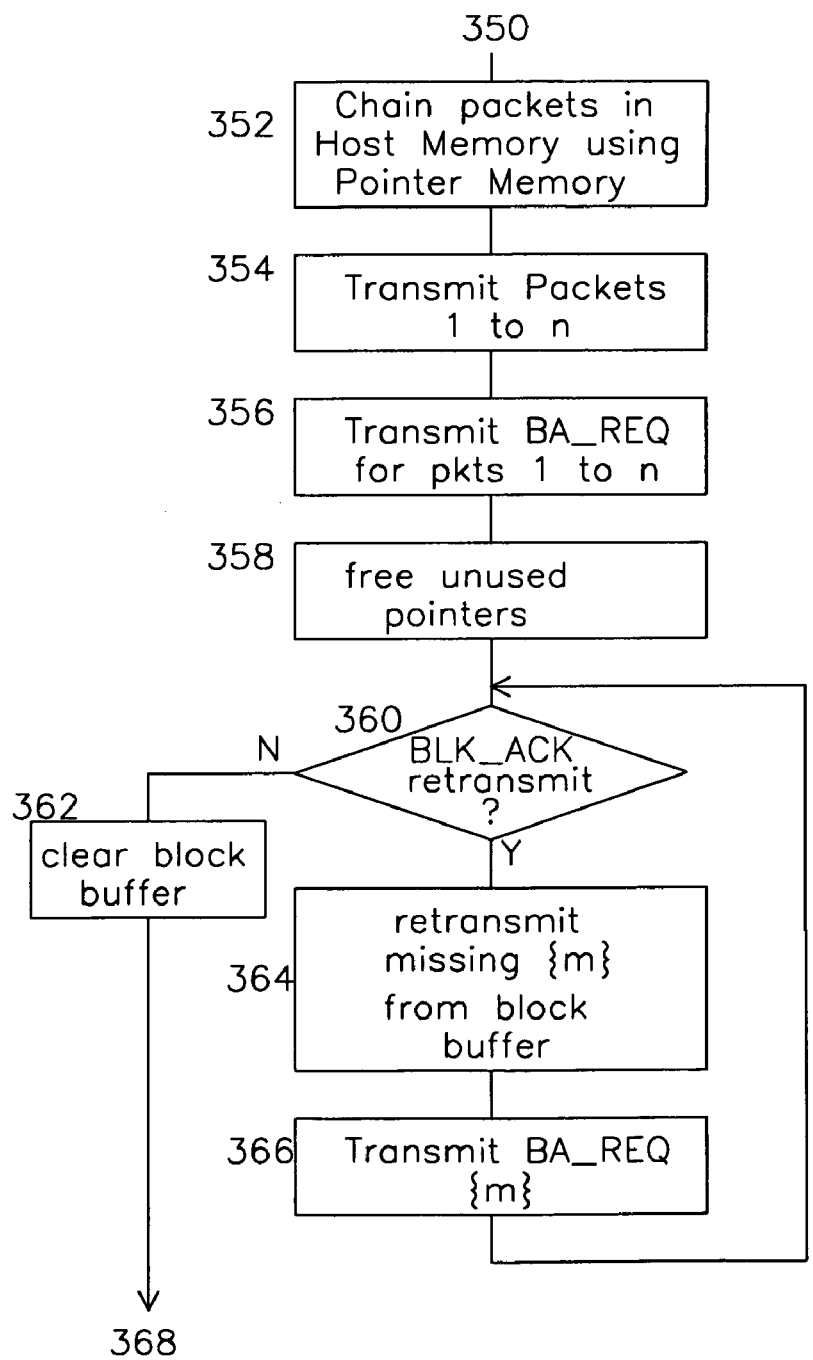
FIG. 3B shows a process flowchart for the acknowledgement process of FIG. 3A.

FIG. 3B shows a flowchart for the operation of the controller of FIG. 3A. After entry 350, the CPU chains packets in the host memory by arranging the pointers of the pointer memory in step 352. The packets are sent through the MAC and saved to the block buffer, optionally with aggregation or encryption, and are transmitted in step 354, followed by a block acknowledgement request in step 356, after which the unused pointers related to packets sent to the MAC are set to a value of FREE or UNUSED 358. The associated BLK_ACK packet includes the identifiers of the packets successfully received 360 by the remote station. If all packets were received the block buffer is cleared 362 and the process exits 368. If there are lost packets as evidenced by packet identifiers missing from the BLK_ACK packet, the successfully received packets are deleted from the block buffer 364, missing packets are transmitted directly from the block buffer 364, and a new BA_REQ is made 366, after which the process returns to step 360 to await the success or failure of the present re-transmit, after which the successfully received packets are deleted from block buffer 362, and unacknowledged packets are re-transmitted 364 with request for acknowledgement 366.

We claim:

1. A packet processor for the transmission of packets having a header and a payload, said packet processor having:
    a pointer memory containing a plurality of pointers;
    a host memory containing data for payloads of said packets, each said packet payload data associated with a particular said pointer;
    a re-transmit controller reading said pointer memory which identifies a location in said host memory, thereafter reading packet data from said host memory location and transferring said packet payload data to a media access controller (MAC) adding at least a packet header to said packet payload data from said input to form a frame, placing said frame into a block buffer which is separate from said host memory, said block buffer transmitting said frame to an output interface;
    said re-transmit controller sending a block acknowledgement request for a plurality of frames transmitted;
    a receive acknowledgement input containing identifiers for acknowledged said frames;
    said re-transmit controller deleting frames from said block buffer after receipt of a block acknowledgement response which identifies previously transmitted frames;
    said re-transmit controller releasing the packet pointer memory location and host memory location associated with each frame transferred to said block buffer when each said frame is transferred;
    said re-transmit controller re-transmitting each frame directly from said block buffer for which an acknowledgement has not been received, said re-transmitting being performed until each said frame in said block buffer has been acknowledged;
    said block buffer thereby containing only complete frames to be transmitted for which receive acknowledgement identifiers have not been received.

2. The packet processor of claim 1 where said header includes a MAC source address, a MAC destination address, and said packet identifier.

3. The packet processor of claim 1 where said output interface is coupled to a broadband processor for performing baseband modulation, the output of which is coupled to a PHY for modulating said baseband modulation with a carrier, the output of which PHY is coupled to an amplifier and thereafter an antenna.

4. The packet processor of claim 1 where said pointer memory contains a single bit associated with a particular region of said host memory.

5. A packet processor having:
    a media access controller (MAC) for accepting packets from a host memory addressed by a packet pointer memory, said MAC adding a header to each said packet to generate a frame, and placing each said frame into a block buffer for transmission to an output interface, said block buffer separate from said host memory and containing frames derived from and associated with each said packet;
    a retransmit controller receiving frame acknowledgements associated with previously transmitted frames;
    said retransmit controller searching over a range including a first value and a last value of previously received said frame acknowledgements to identify unacknowledged frames, said retransmit controller periodically retransmitting said unacknowledged frames directly from said block buffer to said output interface until an associated acknowledgement is received,
    where after placement of a packet into said block buffer from said MAC and before an associated said packet acknowledgement for packets in said block buffer is received, the associated payload host memory for said packet and the associated packet pointer memory for said packet are released,
    said block buffer thereby containing only complete frames to be transmitted for which receive acknowledgement identifiers have not been received.

6. The packet processor of claim 5 where said frame in said block buffer has an associated frame number associated with each said received packet acknowledgement.

7. The packet processor of claim 5 where said header includes at least a MAC source address or a MAC destination address.

8. The packet processor of claim 5 where a new said first value and said second value are formed when a new acknowledgement is received.

9. The packet processor of claim 5 where said generating a frame includes encrypting said frame.

10. The packet processor of claim 5 where said generating a frame includes encrypting a payload part of said frame which does not include said header.

11. The packet processor of claim 5 where said block buffer is coupled to a baseband processor and PHY for modulating said frames and transmitting them over a wireless interface.

12. The packet processor of claim 5 where said memory containing said packets is addressed by a pointer memory.

13. The packet processor of claim 5 where each said packet is stored in a packet memory which is distinct from said block memory.

14. The packet processor of claim 5 where said packet memory and said block memory are a single shared memory.

15. An apparatus having:
- an input port for receiving acknowledgements of a range of previously sent frames;
- a host memory containing packet payloads;
- a packet pointer memory containing pointers to said packet payloads;
- a block buffer for storage of complete frames to be sent, each said frame having a packet payload part and a header part which is derived from said packet payload part, said packet payload part copied from a corresponding said host memory packet payload referenced by said packet pointer memory, said block buffer separate from said host memory;
- a packet retransmit controller comparing said range of previously sent frames to identify unacknowledged previously sent frames in said block buffer and re-transmitting them directly from said block buffer;
- said packet retransmit controller also indicating the availability of block buffer memory associated with an acknowledged frame in said block buffer upon receipt of an associated acknowledgement;
- where, when a host memory payload is copied into said block buffer, the associated host memory payload for said frame and the associated packet pointer memory for said frame are released;
- and said packet retransmit controller retransmits the contents of said block buffer, removing frames for which acknowledgement is received, until said block buffer is empty.

16. The apparatus of claim 15 where a media access controller (MAC) generates said frames from packet data and a header including a MAC source address and a MAC destination address.

17. The apparatus of claim 15 where said MAC also encrypts said packet data, but not said MAC addresses.

* * * * *